United States Patent [19]
Pirwitz et al.

[11] Patent Number: 5,998,563
[45] Date of Patent: Dec. 7, 1999

[54] PHOTOSENSITIVE MATERIAL FOR ORIENTATION OF LIQUID CRYSTAL DEVICE AND LIQUID CRYSTAL DEVICE THEREOF

[75] Inventors: Grit Pirwitz, Worrstedt; Horst Zaschke, Holle; Andrea Hohmuth, Rudisleben, all of Germany; Yuriy Reznikov, Kyyiv, Ukraine; Oleg Yaroshchuk, Kyyiv, Ukraine; Igor Cerus, Kyyiv, Ukraine

[73] Assignee: LG Electronics Inc., Seoul, Rep. of Korea

[21] Appl. No.: 09/083,021

[22] Filed: May 22, 1998

Related U.S. Application Data

[62] Division of application No. 08/956,494, Oct. 22, 1997, which is a continuation of application No. 08/652,041, May 23, 1996, abandoned.

[30] Foreign Application Priority Data

Nov. 20, 1995 [KR] Rep. of Korea ................. 95/42222

[51] Int. Cl.$^6$ ...................................................... C08G 77/04
[52] U.S. Cl. ................................ 528/26; 528/15; 528/32; 556/440
[58] Field of Search ................................. 528/15, 26, 32; 556/440

[56] References Cited

U.S. PATENT DOCUMENTS

| | | | |
|---|---|---|---|
| 3,854,793 | 12/1974 | Kahn | 428/1 |
| 4,545,980 | 10/1985 | Hill | 424/60 |
| 4,554,369 | 11/1985 | Hill et al. | 556/418 |
| 4,562,278 | 12/1985 | Hill | 556/418 |
| 5,093,511 | 3/1992 | Yoshida et al. | 556/440 |
| 5,315,022 | 5/1994 | Yoshida et al. | 556/437 |
| 5,539,074 | 7/1996 | Herr et al. | 526/326 |
| 5,578,351 | 11/1996 | Shashidhar et al. | 428/1 |

FOREIGN PATENT DOCUMENTS

| | | |
|---|---|---|
| 0 138 590 | 4/1985 | European Pat. Off. . |
| 0 525 478 | 7/1992 | European Pat. Off. . |
| 0 611 786 | 8/1994 | European Pat. Off. . |
| 1 373 458 | 11/1974 | United Kingdom . |
| 2 281 977 | 3/1995 | United Kingdom . |
| 2 145 714 | 4/1997 | United Kingdom . |
| WO 96/22561 | 7/1996 | WIPO . |

OTHER PUBLICATIONS

M Schadt et al., Surface–Induced Parallel Alignment of Liquid Crystals by Linearly Polymerized Photopolymers, *Japanese Journal of Applied Physics*, Jul. 1992, vol. 31, No. 7, Part I, p. 2155–2164.

J. Mol. Struct., 348, pp. 175–178, (1995) R. Sinsersuksakul & S. Bualek, "Sprectroscopic Studies of Photocrosslinking of Polysiloxanes Containing Cinnamic Esters".

Abstracts of JP 07196667 A (Kanebo Ltd.) "Silicon–modified Cinnamates and their Use of UV–Absorbers".

Abstract of JP 03204887 A (Shiseido Co. Ltd.) "Preparation of Cinnamate Containing Silicones and Their Use as UV–Absorbers".

W.M. Gibbons et al., Surface–Mediated Alignment of Nematic Liquid Crystals with Polarized Laser Light, *Letters to Nature*, May 1991, vol. 351, p. 49–50.

M Schadt et al., Surface–Induced Parallel Alignment of Liquid Crystals by Linearly Polymerized Photopolymers, *Japanese Journal of Applied Physics*, Jul. 1992, vol. 31, No. 7, Part I, p. 2155–2164.

(List continued on next page.)

*Primary Examiner*—Melvyn I. Marquis
*Assistant Examiner*—Mark W. Milstead
*Attorney, Agent, or Firm*—Finnegan, Henderson, Farabow, Garrett & Dunner, L.L.P.

[57] ABSTRACT

Photosensitive orientation material providing unidirectional LC alignment to generate a high pretilt angle for various LC compounds, and superior thermal stability, and being suitable for mass production, especially for active matrix LC displays, including polysiloxane, and a derivative of a cinnamoyl group.

6 Claims, 5 Drawing Sheets

OTHER PUBLICATIONS

H. Moritake et al., DC–Bias–Field–Induced Dielectric Relaxation in Antiferroelectric Phase of TFMHPOBC, *Japanese Journal of Applied Physics*, Oct. 1993, vol. 32, No. 10A, p. L1432–35.

H. Aoyama et al., Alignment of Liquid Crystals on the Stretched Polymer Films, *Molecular Crystals And Liquid Crystals*, 1981, vol. 72 (Letters), No. 4, p. 127–132.

T. Ya. Marusii, Yu. A. Reznikov, Photosensitive Orientants For Liquid Crystal Alignment, *Molecular Materials*, 1993, vol. 3, p. 161–68.

<LIST OF EXAMPLARY ORIENTATION MATERIALS>

1. PVC 2. 4-FPVC (m.w.=4 $10^3$-4 $10^4$)

3. 3-FPVC 4. 4-F$_3$PVC 5. 4-FPVC+STEARYLE [n/(m+n)=0.01-0.10]

6. PSiC

LIST OF EXAMPLARY ORIENTATION MATERIALS

7. PSiOC 8. 4-FPSiOC 9. 4-C$_3$PSiOC 10. 4-C$_5$PSiOC

LIST OF EXAMPLARY ORIENTATION MATERIALS 11. 4-C$_7$PSiOC 12. 4-C$_8$PSiOC 13. 4-C$_9$PSiOC

14. PSiMCB

PHOTOSENSITIVE MATERIAL FOR ORIENTATION OF LIQUID CRYSTAL DEVICE AND LIQUID CRYSTAL DEVICE THEREOF

This is a division of application Ser. No. 08/956,494, filed Oct. 22, 1997, which is a continuation of application Ser. No. 08/652,041, filed May 23, 1996, now abandoned, all of which are incorporated herein by reference.

BACKGROUND OF THE INVENTION

1. Field of the Invention

The present invention relates to a thermostable photopolymeric film for liquid crystal (LC) alignment.

2. Description of the Prior Art

Several alignment materials have been known for homogeneous alignment of LC; polysiloxane polymers or polyamide polymers, in particular, are known to provide a high quality, thermostable alignment of various LC mixtures. To obtain a monodomain layer orientation for liquid crystal cells, several techniques are known: for example, stretching (H. Aoyama, Y. Yamazaki et al., Mol Cryst, Kiq. Cryst. Lett, 1981, Vol. 72, P 127), microgroove formation (E. S. Lee P. Vetter et al., Jpn Appl Phys., 1993, VOL. 32, P. L1436) and mechanical rubbing of the polymer surfaces (S. Kobayashi et al., Proc, SPIE, 1994, Vol. 2175, P 123; D. S. Soe et al., Mol, Cryst, Liq. Cryst., 1993, vol. 224, P. 13).

However, the above techniques have drawbacks. For example, microgrooves inherently contain defects and these defects are known to cause random phase distortions and light scattering, thus degrading display characteristics. Static electricity generated during the rubbing of the polymer surface is known to cause defects in active matrix LC displays. Moreover, it is practically impossible to orient selected regions of the LC surface locally so that each region has a different orientation with the above techniques.

Other techniques are also known. For example, W. M. Gibbons et al. Nature, 1991, vol. 351, p. 49, M Schdt et al., Jpn. J. Appl. Phys, 1992, vol. 31, part I, p. 2155, and T. Y. Marusii, Y. A. Reznikov. Mol. Mat., 1993, vol. 3, p. 161, EP 0525478 all describe methods of forming photopolymeric a orientation films. According to these other techniques, to form a photopolymeric orientation film, prepolymers were produced by the reaction of a polyvinylalcohol with substituted cinnamic acids. Then, the prepolymers were photopolymerized by irradiation with a linearly polarized ultra-violet (LTV) light beam.

The photopolymerization of the prepolymers caused by directed cross-linking of polyvinylcinnamates (PVCN) linear chains forms a new net polymeric structure with a higher order due to double bond opening reaction in cinnamoyl fragments, i.e. 2—2 cycloaddition reaction. Such a polymeric orientation film possesses an optical anisotropy and is known to planarly orient standard LC molecules in a preferred axial direction perpendicular to the polarization vector of the UV light beam.

However, the main disadvantage of such a photopolymeric orientation film is low thermostability, especially of oblique orientation. In addition, it has been experimentally discovered that with this type of polymer orientation films, the planar alignment of PVCN materials becomes thermally unstable at temperatures above 100–110° C. Moreover, when the LC cell is heated above the clear point $T_1$ and subsequently cooled, dramatic changes in the state of the liquid crystal cell (e.g., from isotropic to nematic to smectic to crystal) occur, degrading the quality of alignment. The thermostability of oblique alignment onto PVCN materials is very poor; it is not better than 50–60° C. As the working temperature range of the LC cell tends to increase, the clear point of the LC cell consequently increases up to a temperature range of 80–100° C. A conventional photopolymer film, which uses a PVCN as a prepolymer, cannot withstand such a high process and operating temperature range. The additional disadvantage of PVCN materials is a poor alignment quality of LC, particularly for active matrix LC displays.

SUMMARY OF THE INVENTION

The present invention overcomes the problems and disadvantages of the prior art by providing a photosensitive material for orientating a liquid crystal comprising a polysiloxane and a derivative of a cinnamoyl group. The photosensitive orientation material provides unidirectional LC alignment to generate a high pretilt angle for various LC compounds, and superior thermal stability, and is suitable for mass production, especially for active matrix LC displays. One of the features of the present invention is to combine the thermostable alignment property of polysiloxane polymers with the photoalignment capability of PVCN polymers. The photoalignment capability is provided by the presence of a derivative of a ciniminic acid in the PVCN polymer, which provides a cross-linking reaction when it is exposed to a polarized light beam.

To achieve the objects and in accordance with the purpose of the invention, the orientation film of the present invention, as embodied herein, preferably includes a photopolymerized polysiloxancinnamate (PSCN) of the general formula.

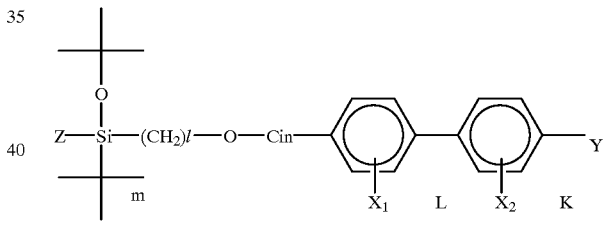

wherein cin is one of the following:

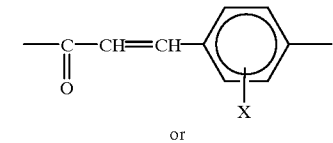

or

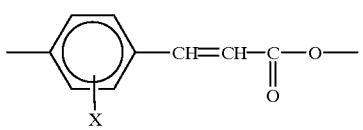

L is 0 or 1, K is 0 or 1 l is 1, 3, . . . , 10

$X, X_1, X_2, Y$ are H, F, Cl, CN, $CH_3$, $CF_3$, $OCF_3$, $C_nH_{2n+1}$, or $OC_nH_{2n+1}$, wherein n is from 1 up to 10, e.g., $X, X_1, X_2$ are H, F, Cl, $CH_3$ and Y is H, F, Cl, CN, $CF_3$, $OCF_3$, $C_nH_{2n+1}$, or $OC_nH_{2n+1}$ (n is from 1 to 10)

m is from 10 to 100

$Z=OH$, $CH_3$, $C_2H_5$, $C_6H_5$, or a mixture of OH and $CH_3$.

Further, the orientation film of the present invention, as embodied herein, may include a material listed in FIG. 4.

According to another aspect of the present invention, the liquid crystal device comprises a substrate, a liquid crystal layer and an orientation layer between the substrate and the liquid crystal layer for orienting the liquid crystal layer, which orientation layer includes a polysiloxane and a derivative cinnamoyl group.

According to yet another aspect of the present invention, the liquid crystal device comprises a first substrate, a second substrate, a liquid crystal layer between the first and second substrates, a first orientation layer over the first substrate including a polysiloxane and a derivative of a cinnamoyl group, and a second orientation layer over the second substrate for orienting the liquid crystal layer cooperatively with the first orientation layer, which second orientation film includes a material different from that of the first orientation film.

According to yet another aspect of the present invention, the liquid crystal device comprises a first substrate, a second substrate, a liquid crystal layer between the first and second substrates, a first orientation layer over the second substrate, the first and second orientation layers each including a photosensitive material for cooperatively orienting the liquid crystal layer, which photosensitive material includes a polysiloxane and a derivative of a cinnamoyl group.

Additional objectives and advantages of the invention will set forth in part in the description that follows and in part will be obvious from the description, or may be learned by practice of the invention. The objectives and advantages of the invention will be realized and attained by means of the elements and combinations particularly pointed out in the appended claims.

The accompanying drawings, which are incorporated in and constitute a part of this specification, illustrate embodiments of the invention and together with the description, serve to explain the principles of the invention.

DESCRIPTION OF THE PREFERRED EMBODIMENT

The active matrix LC display device, according to an embodiment of the present invention, preferably uses a polysiloxancinnamnate (PSCN) as an orientation layer to enhance thermostability and provide a high pretilt angle of the LC cell. The prepolymer was photopolymerized by irradiating it with a linearly polarized ultra-violet (UV) light beam.

Figure 1:
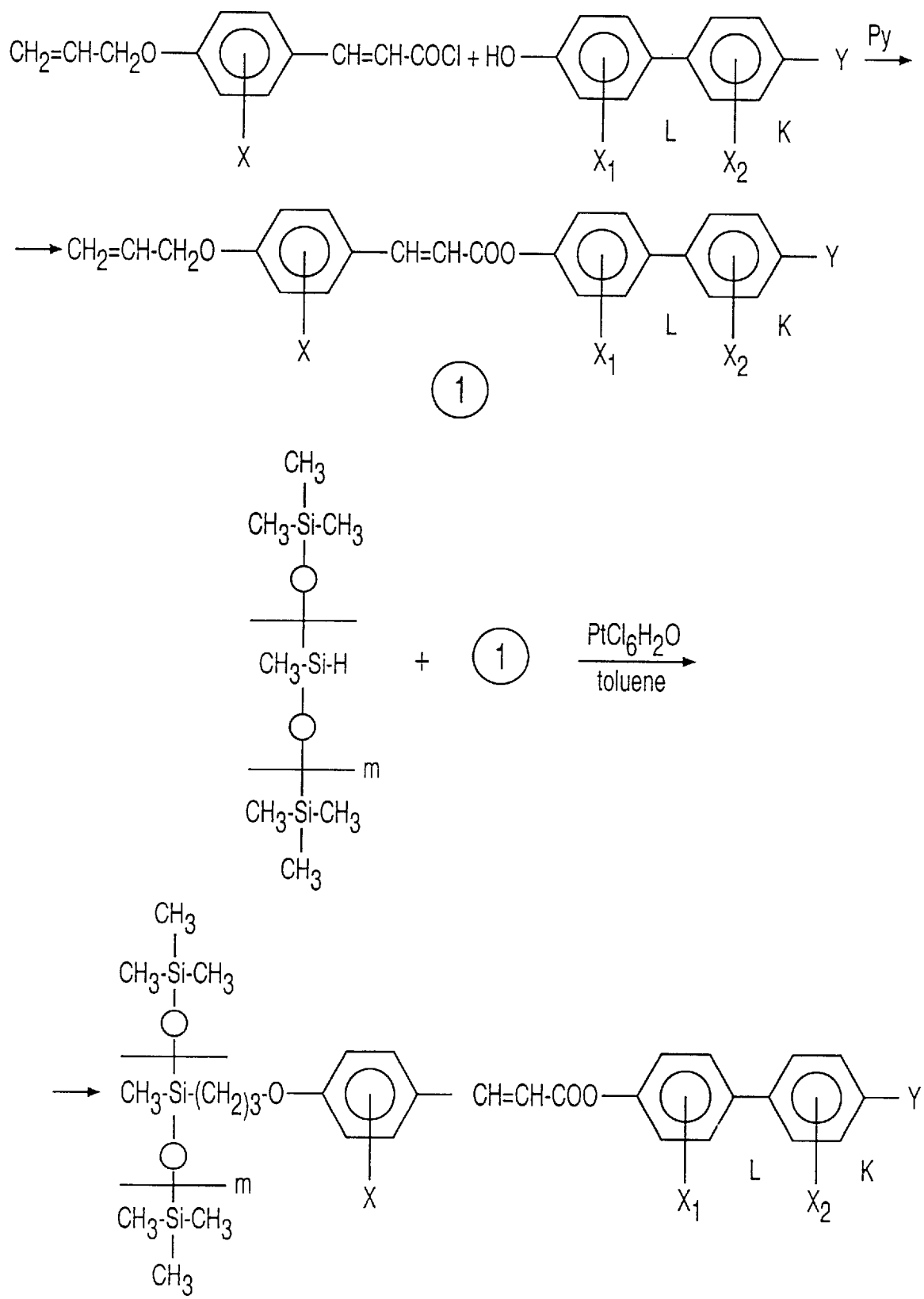
FIG. 1 shows various forms of a polysiloxancinnamate (PSCN) according to an embodiment of the present invention.

Several different types of PSCN have been obtained from an alkyl or aryl esters 4-allyloxycinnamic acid and methylpolysiloxane, or by hydrolyzing 3-(4-substituted cinnamoxy) propyl trichlorosilylanes. More specifically, a new polysiloxancinnamate has been synthesized according to a method, for example, as shown in FIG. 1. The PSCN may be synthesized by a reaction of corresponding polyoxysiloxane derivatives with an esters 4-allyloxycinnamic acid in a boiling toluene in the presence of a catalyst, such as platinum chloride. The resulting PSCN may be reduced by diluting the reaction mixture with methanol, filtrated, dried in a vacuum, and then milled in a vibrating mill.

An exemplary process for making a polymer orientation film, as embodied herein, is described in three stages below:

a) POLYMER SOLUTION: A polymer solution was prepared using a 1:1 mixture of a 1,2-dichloroethane (DCE) and a chlorobezene (CB) for a low molecular weight PSCN and a 1:4 mixture of a DCE and a CB for a higher molecular weight PSCN.

The polymer concentration was determined by the thickness of a coating (or orientation) layer on each glass substrate. The thickness was measured with a Linnik interferometer.

b) POLYMER FILM DEPOSITION: An optimum of a PSCN solution 4 g/l was selected for coating the glass substrate to provide a film thickness of approximately 500 nm. A drop of the PSCN solution was placed in the center of the glass substrate using a measuring pipette. The solution was deposited on the glass substrate by centrifuging to constitute an orientation film. The centrifuging is maintained for approximately 20–30 seconds at a rotational speed of $3-5 \times 10^3$ revolutions per minute. The orientation film was prebaked immediately after the centrifuging at a temperature of approximately 50–150° C. for about 1 hour.

c) FILM ILLUMINATION: The initially isotropic polymer film became anisotropic when it was irradiated with a polarized UV light beam having a wavelength of $\lambda < 365$ nm.

Figure 2:
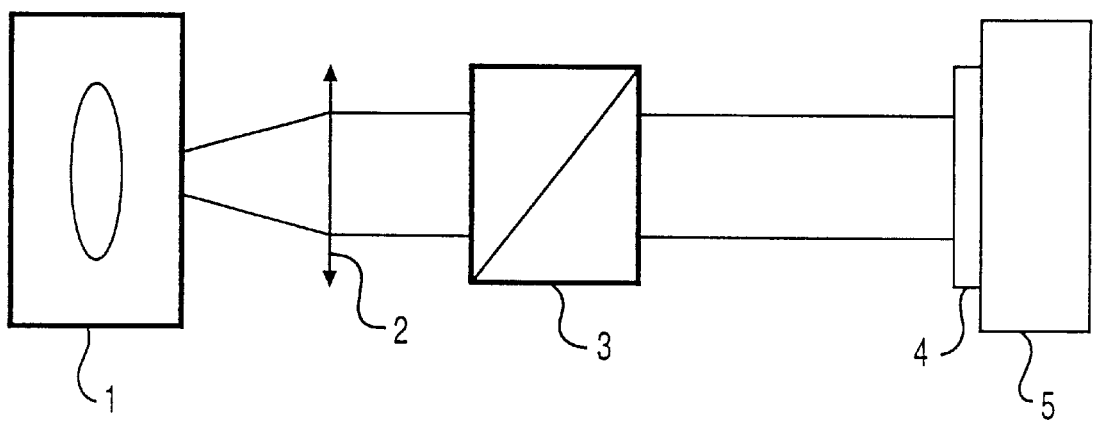
FIG. 2 shows an experimental set up for measuring properties of a photosensitive orientation film according to an embodiment the present invention.
Figure 3:
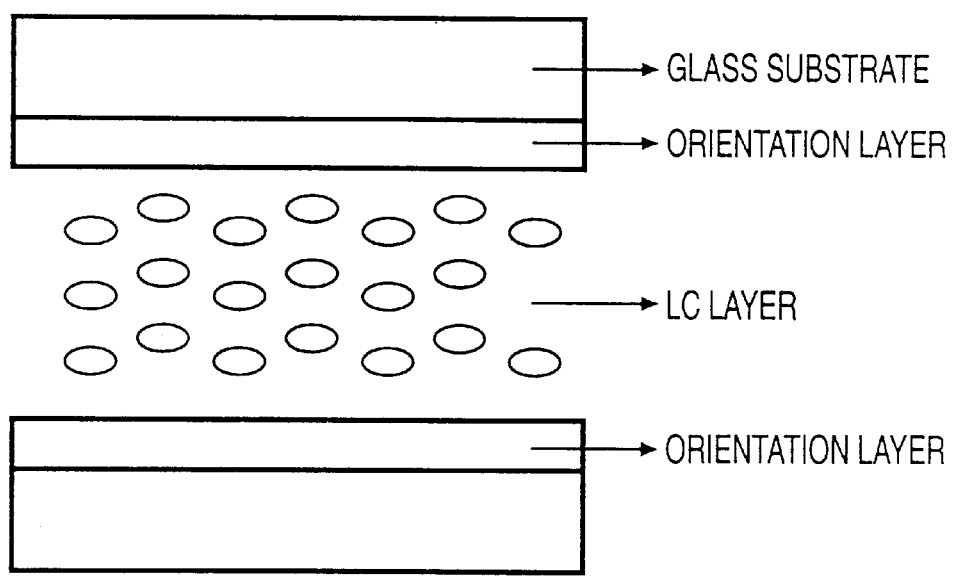
FIG. 3 shows a liquid crystal display device having an orientation film according to an embodiment of the present invention.
Figure 4:
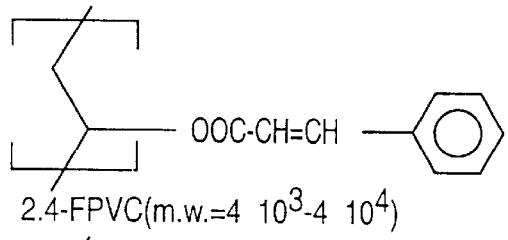
FIG. 4 shows a list of exemplary orientation materials in accordance with an embodiment of the present invention.
Figure 4:
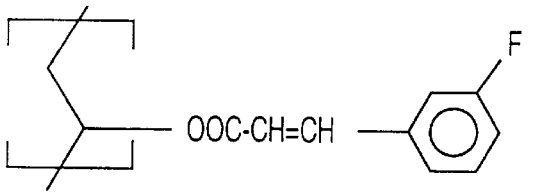
Figure 4:
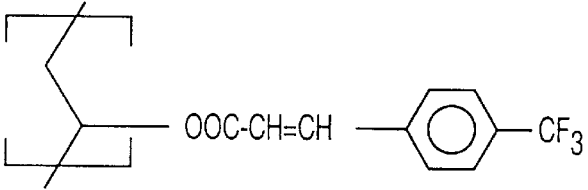
Figure 4:
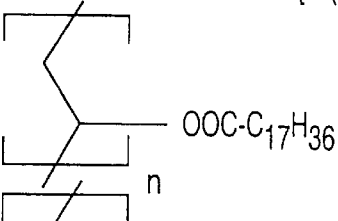
Figure 4:
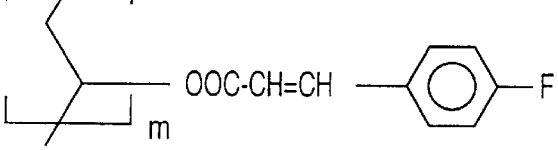
Figure 4:
Figure 4:
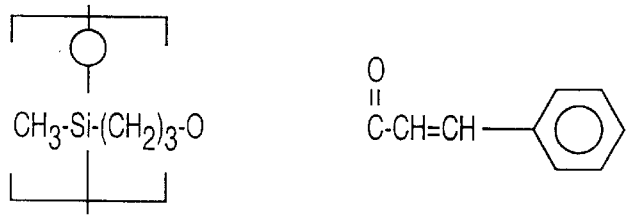
Figure 4:
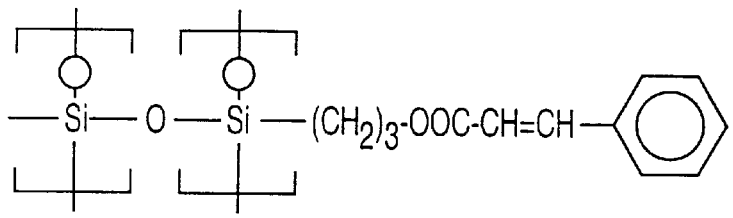
Figure 4:
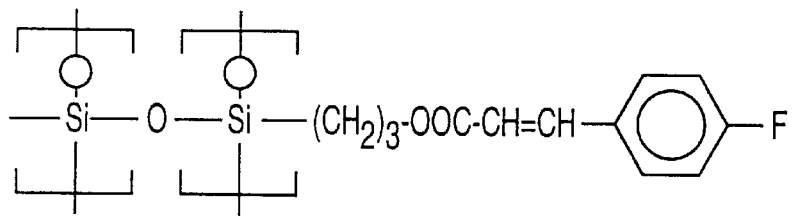
Figure 4:
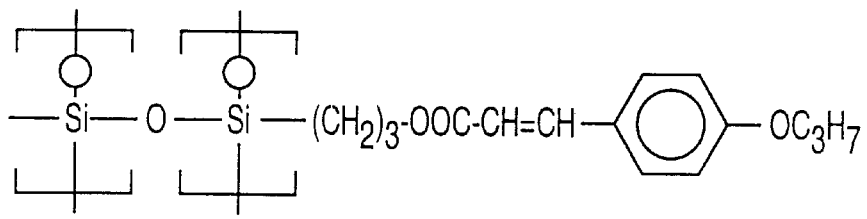
Figure 4:
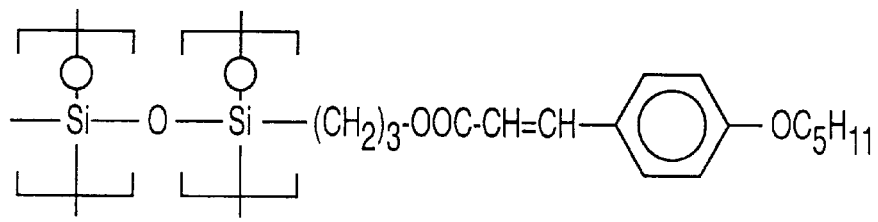
Figure 4:
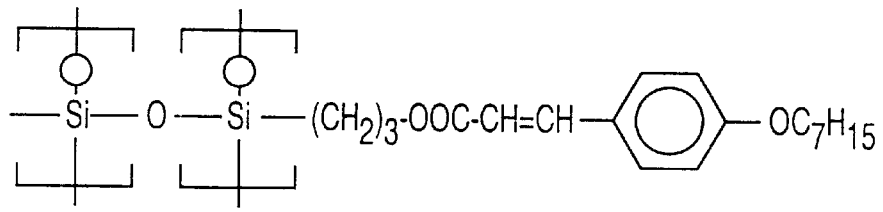
Figure 4:
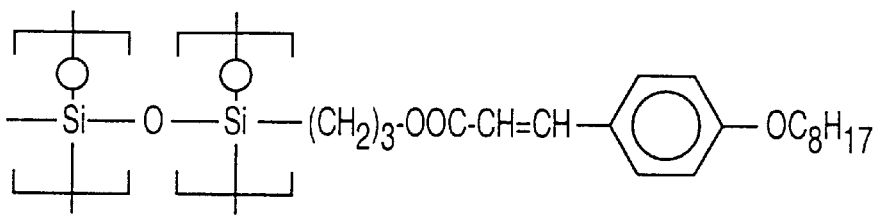
Figure 4:
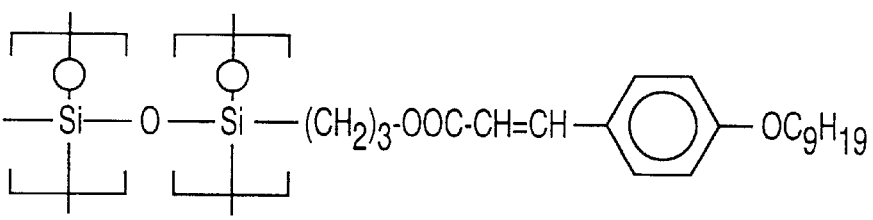
Figure 4:
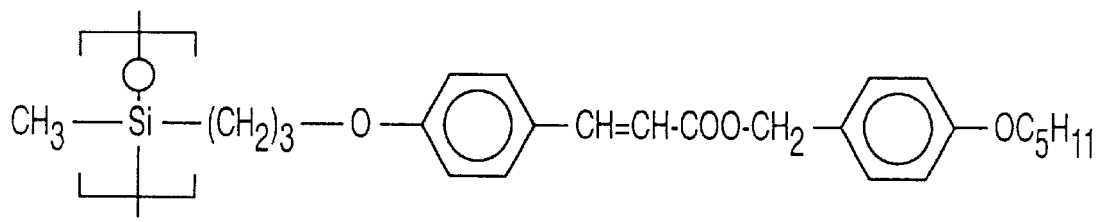

FIG. 2 illustrates an experimental set up for measuring various properties of an orientation layer according to the embodiment of the present invention. FIG. 3 illustrates a liquid crystal display device having an orientation film according to an embodiment of the present invention. FIG. 4 shows a list of exemplary orientation materials in accordance with an embodiment of the present invention.

Referring to FIGS. 2–4, the liquid crystal display having an orientation film according to an embodiment of the present invention will be explained in detail.

A glass substrate 5 coated with a PSCN orientation film 4 was illuminated with a polarized UV light beam. The UV light beam was formed by a Hg lamp 1 with average power of 500 w and a lens system 2, and exposed through a polarizing Glan-Thompson prism 3. The PSCN film 4 on the glass substrate 5 was exposed, for example, for 5–15 minutes at a power density I of 10 mw/cm$^2$.

The LC cell was assembled using a known (sandwich-like) assembling technique: the two glass substrates were set apart by Teflon spacers, and the irradiated PSCN coatings on the surface of each glass substrate faced one another. Then, LC materials for the active matrix displays were introduced into the gap between the two substrates utilizing a capillary effect.

The PSCN film in the LC-cell provides a high quality homogeneous alignment of LC molecules and a pretilt angle which depends on both the time duration of prebaking and the length of the alkyl fragment (Y) of the PSCN: increasing the prebaking time causes a transition from i) a homeotropic via oblique to planar orientation (see Table 1); and ii) a negligibly small tilt angle (PSCN without alkyl chain, Y=H) to a higher tilt angle ($Y=C_nH_{2n+1}$ or $OC_nH_{2n+1}$, n=1 or 2 to 10) (see Table 2). The tilt angle of the LC-director (i.e., the direction of the average orientation of the "long axes" of the molecules by a unit vector) on the PSCN was measured according to the technique described in Proceedings of the 15th International Liquid Crystal Conference, Budapest, Hungary (to appear in Mol. Cryst. Liq. Cryst, 1994).

TABLE 1

Dependence of the tilt angle of LC on the prebaking time of the PSCN with Y = OC$_5$H$_{11}$.

| Time(min) (T-200° C.) | Tilt angle, θ (deg) |
|---|---|
| 1.5 | 90 |
| 60 | >15 |
| 120 | 0 |

TABLE 2

Pretilt angle data of LC-mixtures in LC cells certain different PSCN-material.

| X | X$_1$ | X$_2$ | l | k | Y | Tilt angle |
|---|---|---|---|---|---|---|
| H | — | H | 0 | 1 | H | 0 |
| H | — | H | 0 | 1 | CH$_3$ | 0 |
| H | — | H | 0 | 1 | C$_3$H$_7$ | 3 |
| H | — | H | 0 | 1 | OC$_4$H$_9$ | 3 |
| H | — | H | 0 | 1 | OC$_6$H$_{13}$ | >15 |
| H | — | H | 1 | 1 | OC$_8$H$_{17}$ | >15 |

Moreover, the optical and electrooptical characteristics of the LC cell demonstrate that the PSCN-films are suitable for LC alignment. The LC cells formed between the substrates covered with the prepolymers were experimentally proven to be superior in thermostability for both homogenity of orientation and pretilt angle stability.

According to an embodiment of the present invention, the thermostability was measured by i) a visual observation of the quality of LC alignment between the crossed polarizers and by ii) measuring the tilt angle θ after several heating-cooling cycles. The twisted PSCN film was tested on an automatic experimental set up normally used for measuring the electrooptic characteristics of the LC cell. When the substrates covered with orientation films of a photopolymerized PSCN (or also with filled LC cells) were tested, these characteristics were not altered even after the substrate had been subjected to a temperature of 150° C. for 2 hours.

Preferred embodiments of the present invention will now be further described in reference to specific examples. It should be understood that these examples are intended to be illustrative only and the present invention is not limited to the conditions, materials or devices recited therein.

EXAMPLE 1

4-Fluorophenyl Ester of 4-allyloxycinnamic Acid

A 0.2 mol pyridine was added to a mixture of a 0.1 mol 4-allyloxycinnamoly chloride and a 0.12 mol phenol in a 100 ml toluene. To mixture was left overnight and filtered. The filtrate was washed with water and dried using anhydrous magnesium sulphate. The residue obtained after the magnesium sulphate and solvent had been removed was crystallized from isopropyl alcohol. Yield 72%, m.p. 63° C. IR spectrum, V, cm$^{-1}$: 1710 (C—O), 1230–1240 (C—O—C), 1635 (CH=CH); f-NMR spectra (Bruker WP 200): multiplet at 100 md, Ar—F. The following compounds were obtained in similar ways:

Ethyl ester of 4-allyloxy-2-fluorocinnamic acid;
  Pentyl ester of 4-allyloxy-3-chlorocinnamic acid;
  Decyl ester of 4-allyloxy-2-methylcinnamic acid;
  Phenyl ester of 4-allyloxycinnamic acid;
  4-Propyloxyphenyl ester of 4-allyloxy-3-fluorocinnamic acid;
  4-Nonyl-2-methylphenyl ester of 4-allyloxycinnamic acid;
  4-Cyano-3-fluorophenly ester of 4-allyloxy-2-chlorocinnamic acid;
  4-Trifluoromethylphenyl ester of 4-allyloxycinnamic acid;
  4-Trifluoromethylphenyl ester of 4-allyloxy-2-methylcinnamic acid;
  4-Methylbiphenyl-4 ester of 4-allyloxycinnamic acid;
  4-Butyl-2-chlorobiphenyl ester of 4-allyoxycinnamic acid;
  3-Fluorobiphenyl.4 ester of 4-allyloxy-3-chlorocinnamic acid; and
  4-Decyloxy-3-methylbiphenyl ester of 4-allyloxycinnamic acid.

EXAMPLE 2

Polysiloxancinnamic Synthesis

A mixture of 0.05 mol of a corresponding ester of 4-alloyoxycinnamic acid, 0.1 mol methylpolysiloxane and catalytic quantities of platinum chloride in 100 ml benzene was boiled for 10 hours, cooled and diluted with methanol. The reaction product was filtered and washed with methanol. Thereafter, the polysiloxancinnamate was dried in a vacuum at a temperature of 50–60° C. until a desired amount was obtained, and subsequently milled in a vibrating mill. The final yield was approximately 87–92%. It was determined that there were no double bond of allyloxy molecules from NMR spectra (Bruker WP2000).

EXAMPLE 3

Fabrication of Liquid Crystal Cell

The liquid crystal cell was assembled using a known method facing the irradiated PSCN coated surfaces of two substrates toward one another. Liquid crystal materials were filled into the gap between the two substrates, as shown in FIG. 3.

Alternatively, only one of the two substrates was coated with a photosensitive PSCN material and another of the two substrates was coated with a different material. For example, the different material may preferably include a polyimide, polyamide, polyvinyl 4-methoxy-cinnamate, polyvinylcinnamate, polyvinyl fluorocinnamate, polyvinylalcohol (PVA), silicon dioxide or other metal oxides.

Other embodiments of the invention will be apparent to those skilled in the art from consideration of the specification and practice of the invention disclosed herein. It is intended that the specification and examples be considered as exemplary, with the true scope and spirit of the invention being indicated by the following claims.

What is claimed is:

1. A photosensitive material for the orientation of a liquid crystal, comprising:
  a polysiloxane;
  a derivative of a cinnamoyl group, wherein said polysiloxane includes either a OH or CH$_3$, and wherein said derivative of a cinnamoyl group includes F, Cl, CN, CF$_3$, OCF$_3$, C$_n$H$_{2n+1}$ (n is from 1 to 10), or OC$_n$H$_{2n+1}$ (n is from 5 to 10); and
  a —(CH$_2$)$_k$—O— group, wherein the Si-atom of said polysiloxane is bonded to the terminal —CH$_2$— radical of the —(CH$_2$)$_k$—O— group, and wherein the phenyl group of the derivative of the cinnamoyl group is bonded to the O-atom of the —(CH$_2$)$_k$—O— group, wherein k is 1 up to 10.

2. A photosensitive material for the orientation of a liquid crystal, comprising:

a polysiloxane;

a derivative of a cinnamoyl group, wherein said polysiloxane includes a mixture of OH and $CH_3$, and wherein said derivative of a cinnamoyl group includes F, Cl, CN, $CF_3$, $OCF_3$, $C_nH_{2n+1}$, or $OC_nH_{2n+1}$ (n is from 1 to 10); and a —$(CH_2)_k$—O— group, wherein the Si-atom of said polysiloxane is bonded to the terminal —$CH_2$— radical of the —$(CH_2)_k$—O— group, and wherein the phenyl group of the derivative of the cinnamoyl group is bonded to the O-atom of the —$(CH_2)_k$—O— group, wherein k is 1 up to 10.

3. A photosensitive material for the orientation of a liquid crystal, comprising:

a polysiloxane;

a derivative of a cinnamoyl group, wherein said derivative of a cinnamoyl group includes F, Cl, CN, $CF_3$, $OCF_3$, $C_nH_{2n+1}$ (n is from 1 to 10), or $OC_nH_{2n+1}$ (n is from 5 to 10); and a —$(CH_2)_k$—O— group, wherein the Si—atom of said polysiloxane is bonded to the terminal —$CH_2$— radical of the —$(CH_2)_k$—O— group, and wherein the phenyl group of the derivative of the cinnamoyl group is bonded to the O-atom of the —$(CH_2)_k$—O— group, wherein k is 1 up to 10.

4. A photosensitive material for the orientation of a liquid crystal, having the following formula:

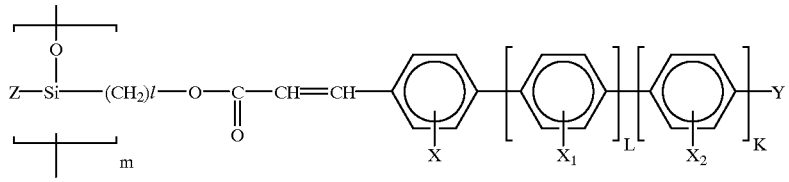

wherein Z is selected from the group consisting of OH, $CH_3$, $C_2H_5$, $C_6H_5$, and a mixture of OH and $CH_3$;

m is from 10 up to 100;

l is from 7 up to 10;

L is 0 or 1;

K is 0 or 1;

X is selected from the group consisting of $CF_3$, $OCF_3$, $C_nH_{2n+1}$, and $OC_nH_{2n+1}$, wherein n is from 1 up to 10;

$X_1$ and $X_2$ are selected from the group consisting of $OCF_3$ and $C_nH_{2n+1}$, wherein n is 1, 3, or from 5 up to 10, and $OC_nH_{2n+1}$, wherein n is 2 or from 6 up to 10; and Y is selected from the group consisting of $OCF_3$ and $OC_nH_{2n+1}$, wherein n is from 1 up to 10.

5. A photosensitive material for orientation of a liquid crystal, having the following formula:

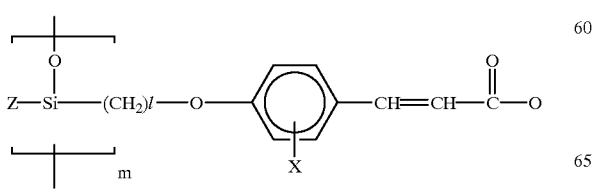

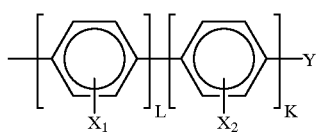

wherein Z is selected from the group consisting of OH, $CH_3$, $C_2H_5$, $C_6H_5$, and a mixture of OH and $CH_3$;

m is from 10 up to 100;

l is from 1 up to 10;

L is 0 or 1;

K is 0 or 1; K+L>0 and

X, $X_1$, $X_2$, Y are selected from the group consisting of H, F, Cl, CN, $CH_3$, $CF_3$, $OCF_3$, $C_nH_{2n+1}$, and $OC_nH_{2n+1}$, wherein n is from 1 up to 10.

6. A photosensitive material for orientation of a liquid crystal, having the following formula:

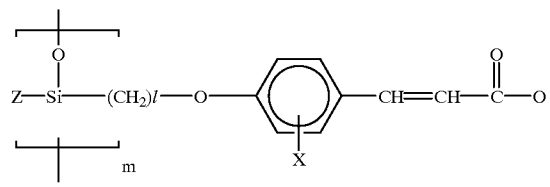

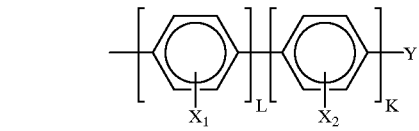

wherein Z is selected from the group consisting of OH, $CH_3$, $C_2H_5$, $C_6H_5$, and a mixture of OH and $CH_3$;

m is from 10 up to 100;

l is from 1 up to 10;

L is 0 or 1;

K is 0 or 1; and

X, $X_1$, and $X_2$ are selected from the group consisting of H, F, Cl, CN, $CH_3$, $CF_3$, $OCF_3$, $C_nH_{2n+1}$, and $OC_nH_{2n+1}$, wherein n is from 1 up to 10; and Y is selected from the group consisting of H, $CH_3$, $CF_3$, and $C_nH_{2n+1}$, wherein n is from 1 up to 10.

* * * * *